June 17, 1930.  E. W. REED ET AL  1,764,053
ROLLED THREAD WOOD SCREW
Filed Dec. 23, 1929

INVENTORS
Edwin W. Reed
Adolph Werme
BY
Howard W. Dix.
ATTORNEY

Patented June 17, 1930

1,764,053

UNITED STATES PATENT OFFICE

EDWIN W. REED AND ADOLPH WERME, OF WORCESTER, MASSACHUSETTS, ASSIGNORS TO REED AND PRINCE MANUFACTURING COMPANY, OF WORCESTER, MASSACHUSETTS, A CORPORATION OF MASSACHUSETTS

ROLLED-THREAD WOOD SCREW

Original application filed June 15, 1928, Serial No. 285,529. Divided and this application filed December 23, 1929. Serial No. 416,090.

This invention relates to a novel method of manufacturing screws, and to the improved products resulting therefrom. The invention has particularly to do with the manufacture of improved rolled thread wood screws but is not limited thereto.

Hitherto, in the manufacture of screws, it has been customary to cut the threads by means of suitable machines. Such a process is inherently wasteful, both in time consumed and in the necessity of removing material to form the screw threads.

To avoid such wasteful methods, it has been proposed to roll threads on suitable blanks after forming the blanks to the approximate size of the desired article, or carrying out all of the necessary blank-forming steps simultaneously, or in any suitable sequence.

The articles so formed have not proven satisfactory nor efficient, and are characterized by the serious disadvantage of inherent structural weakness, which may be due to one or more causes. The primary cause of the weakness of such screws practically always resides in the fact that the barrel and shank portions are of different diameters, and at the junction point of the two portions a pronounced undesirable shoulder is formed. This shoulder lying between or joining two sections of different cross-section, defines a plane of minimum strength, as the shank being normally reduced in size is smaller than the barrel, and, therefore, not possessed of the same tensile strength.

In this description, the lower threaded portion of a screw is referred to as the shank, and the upper unthreaded portion is designated generally as the barrel. The upper portion of the barrel is provided with an upset or head section which is usually slotted to receive a screw driver or like implement.

In practice it has been found that screws fail at the shoulder, the shank or portion of reduced diameter shearing off from the barrel or large diameter portion when pressure is applied to force the threaded portion of the shank into its sheath. This failure appears to increase perceptibly with increase in length of the screws.

It is an object of the present invention to provide a process for manufacturing an improved screw which is characterized by a satisfactory stress resisting capacity throughout its length.

It is another object of this invention to provide a process which is adapted to assure the production of improved screws in an economical and efficient manner.

Yet another object of this invention is the provision of an improved screw which is characterized by a high tensile strength which is satisfactorily and efficiently distributed throughout its body, thereby providing the necessary strength at points of greatest stress, which are normally the points of failure in screws heretofore manufactured.

These and other desirable objects and advantages will be set forth in the accompanying specification and illustrated in the drawings, a preferred embodiment being shown and described by way of illustration only, for since the underlying principles may be incorporated in other specific devices, it is not intended to be limited to the one shown, except as such limitations are clearly imposed by the appended claims.

In the drawings, like numerals refer to similar parts, throughout the several views, of which Fig. 1 is an elevational view of a pointed blank for use in the process;

In manufacturing a screw according to the present invention, a blank having a body portion 1, and preferably a pointed end portion 2, is forced into a suitable die, not shown. The die may be of any suitable size and is provided with a tapered shoulder and a shank portion together with a countersunk head portion. Fitting into the shank portion of the die is a movable knock-out portion, or ejector, provided with a conical recessed tip to receive the tip of the blank.

Figure 1:
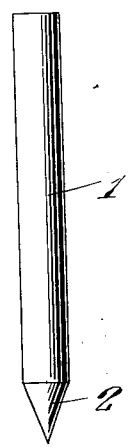
Figure 2:
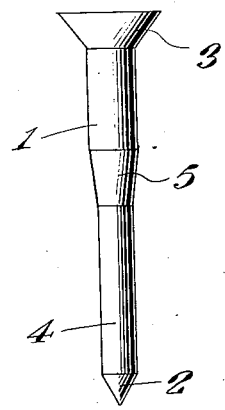
Fig. 2 is an elevational view of a blank which has been formed with a shank and a headed portion, and in which the barrel is connected to the shank by an integral tapered portion.

Referring now to Fig. 2 it will be noted that the roughed-out blank comprises body portion or barrel 1, tip 2, head 3, shank 4, and an integral tapered portion 5, connecting the shank and body. The suitable tapered portion 5 of the blank is provided for the purposes hereinafter defined. It has been found that a preferred angular relation of the taper to the axis of the blank or screw lies between 20 to 26°, the variation in the angle being governed by the length of the screw and the purposes of its use, as will appear more in detail.

The reduced portion of shank 4 will normally have a cross-section of about 75 to 80 percent of that of the body portion, which is left unthreaded. This ratio may be varied as desired, but the above figures have been found to represent the average relations obtaining between the two parts of the blank adapted for having wood screw threads rolled thereon. It will be seen that an abrupt change in the external diameters of two adjacent integral portions of a body will subject the body to a severe stress at the point of such change, thereby facilitating rupture when pressure is applied. By the provision of a proper tapered portion between the body and the shank, the inherent difficulties due to an abrupt change in cross-section are overcome, and added advantages of strength as well as ease of manufacture are presented, which will be discussed further hereinafter.

The external diameter of the thread at the tapered portion should equal the external diameter of the thread on the shank portion (see Fig. 4), otherwise it evidences improper design with resulting lack of metal at the point of greatest stress, giving rise to a marked decrease in strength of the screw which is due to the decrease in the effective diameter of the threads, thereby resulting in less gripping power.

The screws of the present invention are designed to obtain proper gripping power or strength, by insuring that the threads have a uniform external diameter consonant with maximum efficiency. This uniformity in external diameter of the threads is secured by the proper taper above noted whereby the resulting root diameter of the threads is substantially equal throughout the shank, the point excepted, and the root diameter then gradually increases throughout the tapered section maintaining at the same time a constant outside thread diameter. Both external thread diameter and root diameter finally merge into the unthreaded portion or barrel of the screw.

After the blank has been formed as indicated in Fig. 2 the head is slotted, or shaved and slotted, if necessary, depending on the type of screw being made. The finished blank is then subjected to the threading operation, which, as is well known to those skilled in the art of roll threading, consists in subjecting the portion of the blank to be threaded to the action of a pair of grooved die plates, between which the shank of the blank is rotated while subjected to compression, whereby the metal of the surface of the shank is flowed into the threads of the die plates, thereby forming the thread of the screw so that the external thread diameter is provided as above defined. The root diameter of the thread after rolling is indicated at 4', the difference between 4 and 4' having been used to form the threads.

Figure 3:
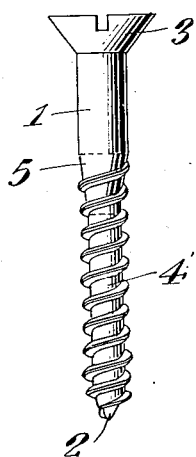
Fig. 3 is an elevation of a finished wood-screw showing the rolled thread.
Figure 4:
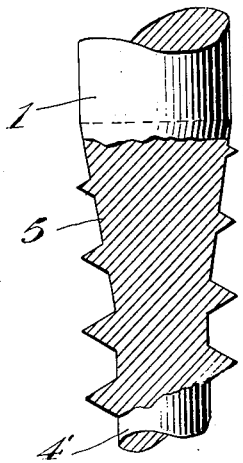
Fig. 4 is an enlarged detail vertical cross-section taken through the tapered portion of a screw.

The pitch or helix angle of the finished screw will vary according to the uses for which it is intended; thus, a wood screw, such as is shown in Figs. 3 and 4, will have a pitch approximately double that of a metal thread, or machine screw. In a wood screw the helix angle therefore leaves a more conspicuous reduction of area between the junction of the screw thread and the unthreaded shoulder, or barrel of the screw, than is left in the case of a machine screw.

In the article made according to the present invention, a gradually deepening thread is provided at the junction of the unthreaded and threaded portions of the screw, extending from portion 1 to portion 4', see Fig. 4, thereby eliminating the abrupt change of area at the shoulder, which has heretofore been the point of greatest weakness in rolled thread screws. The strengthening of the screw by the provision of a properly tapered shoulder portion as disclosed herein, is a feature of great importance in rolled thread wood screws, except possibly in a relatively small proportion of very short length screws, because as the length of a wood screw increases, the friction caused by driving long screws into wood—particularly woods of the hard variety—seriously threatens to break the screw before it has been properly seated. In many cases where the old type of rolled thread wood screw failed and broke either at the head or shoulder great trouble was experienced in removing the broken part, which often could not be accomplished without seriously damaging the piece in which the screw had broken. In many instances it was necessary to replace the piece.

Another important advantage of the present invention resides in the fact that the quality in the reduced portion of the screw blank is not adversely affected by the extrusion operation, the upper limits of this portion and the tapered portion being indicated in dotted lines in Figs. 3 and 4. Therefore, the subsequent thread rolling operation is readily performed and the resulting threads are of proper form and quality, and the barrel and head are less likely to have imperfections. The improvement in manufacture due to lack of imperfections in the finished product enables the production of satisfactory screws in quantity, thereby increasing output while permitting less attention to details.

In producing the rolled thread wood screws heretofore, the usual method has been to upset the barrel and head of the rolled thread wood screw blank from wire having the correct size for rolling the threads, the diameter of such wire is necessarily smaller than the unthreaded or barrel diameter.

In carrying out the process of the invention, the wire or other stock, of suitable diameter, may be first heat treated or annealed and drawn or simply drawn from rods to secure the proper tensile strength. The desired tensile strength should be a maximum for the purposes desired, while at the same time sufficient ductility is preserved to allow flowing the metal to form the threads on the shank as well as about the junction of the threaded and unthreaded portions of the blank. The ductility of the metal also facilitates its flow into the gimlet point without breaking down the structure.

As has been pointed out above, all of these features permit the formation of an improved screw with a minimum of mechanical working while at the same time securing the desired and satisfactory structure of the finished article.

The present invention has been described with particular reference to the manufacture of rolled thread wood screws which are subject to a number of mechanical imperfections when made by the process of the prior art. A particular disadvantage of such wood screws has been the requirement of upsetting more material and required performing the heading operation in two steps. This usually results in foliation of the head so that when pressure is applied by means of a screw driver or the like, there is splitting at the slot or at the foliation which destroys the screw and usually prevents its removal.

By accurately forming the taper of the shoulder referred to, and by similarly forming the corresponding taper on the rolling dies for rolling the thread, it has been found that after a great many experiments and calculations it is possible to flow and adjust the metal in the tapered shoulder, through the forming of the blank and the subsequent rolling, so that there is no abrupt contraction of area, which is responsible for the previously mentioned defect in rolled thread wood screws, which defect is usually responsible for the high percentage of failures in such articles at the junction of threaded and unthreaded portions. These improvements in manufacturing eliminate the defects in rolled thread wood screws previously referred to, and supply the strength formerly lacking and make the operation practical instead of impractical.

The combination of a straight and tapered shank upon which the screw threads are rolled, as above intimated, has made possible highly desirable economies in the manufacture of such articles, due to the uniform quality and strength of the finished articles and the simplicity of the manufacturing process.

The extrusion of the wire or rod results in the formation of a blank which is of maximum strength throughout its entire extent and is not subject to points of local weakness, especially in the shank, which is characteristic of articles which have been formed entirely by upsetting.

It is also to be noted that the present method does not involve the formation of any considerable skin of hardened metal over the surface of the extruded blank, which skin normally affords considerable resistance to the thread rolling operation, and results in splitting or otherwise deforming the threads.

The forming of the headed blank with the requisite tapered and shank portions in a single operation is highly desirable from the manufacturing standpoint, and more particularly for the reason that it avoids the foliation of the head from excessive upsetting and the skin effect due to excessive drawing, above referred to. It will of course be understood that by the extrusion of uniform lengths of wire whereby the unthreaded diameter remains the same and the lower end is reduced, while the head is upset, there is not as much extrusion required as heretofore, and that the flow of metal may now be governed so that the strains are not detrimental. The formation of the blank and particularly the taper portion thereof contemplates such working of the metal as is within the natural flow lines of the metal. The strains are not harmful because the small amount of extrusion to which the blanks are subjected is within the metal working range that gives an increase in tensile strength, as it is well known in the wire drawing art that the tensile strength increases on working, up to a certain point, and that thereafter the wire must be annealed before being subjected to further working. The extrusion comprehended in the present invention comes within the above-mentioned cold working range, and there is a further saving due to the elimination of any annealing steps.

The blank shown in Fig. 2 may be made up in any desired quantity and sold as such, or may be stored until it is desired to complete the threading operation. These blanks may have any desired pitch of thread rolled thereon, and are themselves novel articles due to their improved design, with the resulting improvements imparted to the finished articles made therefrom, as has been clearly set forth above.

It will now be seen that there has been provided an improved process for forming blanks adapted for use in rolling screws, and more particularly wood screws, which process results in marked saving in both material and labor, together with improved structual features realized in the finished article by virtue of the improved design, whereby maximum strength is imparted to a finished screw at the point of greatest strain, and at other points which have been found to be subject to more than normal strains.

This application is a division of my copending application, Serial No. 285,529, filed June 15, 1928, for improvements in rolled thread screws.

What is claimed is:

1. In a process of making rolled thread wood screws, the steps of forming a blank from wire, reducing a portion of the blank by extrusion, controlling the extrusion process so that the juncture between the original and the reduced portion of the blank is tapered, the taper conforming substantially to the natural flow lines of the metal, and thereafter rolling threads in said tapered and in said reduced portions.

2. In a process of making rolled thread wood screws, the steps of producing wire of prerequired tensile strength, forming a blank therefrom, reducing a part of said blank by extrusion to form a small diametered cylindrical portion and an intermediate tapered portion located between said reduced portion and the part not reduced, controlling the extrusion process so that the tapered portion conforms substantially to the natural flow lines of the metal, said extrusion processing acting to increase the tensile strength of said smaller diametered portion and said intermediate portion, and thereafter rolling threads in said tapered and in said smaller diametered portions to provide threads of equal external diameter, and equal to the diameter of the unextruded part of said blank, said extrusion and rolling processing being accomplished without intermediate heat treatments.

3. In a process of making rolled thread wood screws, the steps of processing wire to form a blank, reducing a portion of the blank by extrusion, controlling the extrusion process so that the juncture between the original and the reduced portion of the blank is tapered, the taper conforming substantially to the natural flow lines of the metal, and thereafter rolling threads in said tapered and in said reduced portions to an external diameter approximately equal to the diameter of the unreduced portion of said blank and thereby providing maximum torsional strength and maximum holding power at said tapered section.

EDWIN W. REED.
ADOLPH WERME.